United States Patent Office 3,162,636
Patented Dec. 22, 1964

3,162,636
1-ALKYL-2-HETERO-1,2,3,4-TETRAHYDRO-QUINAZOLINE-4-ONES
Harvey Gurien, Newark, N.J., and Thomas P. Gordon, Carnegie, Pa., assignors to S. B. Penick & Company, New York, N.Y., a corporation of Delaware
No Drawing. Filed Jan. 23, 1963, Ser. No. 253,294
4 Claims. (Cl. 260—251)

This invention relates to 1,2,3,4-tetrahydroquinazoline-4-ones and more particularly to 1-alkyl-2-aryl-1,2,3,4-tetrahydroquinazoline-4-ones, having the general structure:

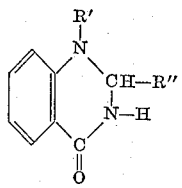

where R' is alkyl and R" aryl and methods for preparing. A related compound, 1-methyl-2-benzyl-1,2,3,4-tetrahydroquinazoline-4-ones has been reported as a degradation product from materials isolated from natural sources (Chakravarti et al., J. Chem. Soc., 1953, 33-37-40).

This invention according to its process aspects contemplates the reaction of the appropriate o-alkylaminobenzamide with the appropriate aromatic aldehyde according to the equation:

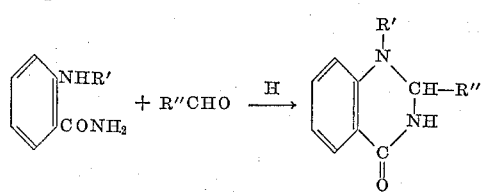

A suitable slightly polar solvent is a convenient medium for carrying out this reaction. For reasons of economy and solubility, the lower alkanols are the preferred solvents with ethanol as the solvent of choice. The reaction is encouraged by the presence of mineral acids. The mineral acids serve as sources of hydrogen ions. While phosphoric and sulfuric acid will encourage the reaction, hydrochloric acid is preferred as it is easily volatilized when the reaction is completed.

It is preferred to carry out this reaction at the reflux temperatures of the solvents. Under such conditions, the reactions are completed at yields above 50% within 24-36 hours.

The compounds of this invention have shown miticidal activity and are useful in controlling such economic pests.

The compounds of this invention were tested against the 2-spotted spider mite (*Tetranychus telarius*) according to a method developed at Rutgers University. One week old bean plants at the 2 leaf stage, each leaf 1½ inches long are dipped into emulsions or solutions of candidate materials. Each test plant is then infected with approximately 25 adult mites. Mortality counts are made one and three days after treatment. The compound of Example 1 in replicate tests produced an average 93% mortality when applied in 0.05% solution. The other compounds of this invention similarly showed miticidal activity.

The invention and its practice will be described in the examples below and is defined in the claims appended.

EXAMPLE 1

*1-n-Pentyl-2-Phenyl-1,2,3,4-Tetrahydroquinazoline-4-Ones* o-N, (1-pentyl) aminobenzamide (0.04 mole) 7.9 grams and (0.04 mole) 5.3 grams of benzylaldehyde are suspended in 30 to 40 ml. of ethanol, acidified with 1 drop of concentrated hydrochloric acid. The mixture is refluxed for 36 hours. The acidified solvent is removed under reduced pressure and the residue is recrystallized from toluene. The physical constants and analysis will be found in Table 1.

Examples 2 to 11 are prepared according to the method set forth in Example 1 using the appropriate o-N,(alkyl)-aminobenzamide and a slight excess of the appropriate aromatic aldehyde. The reaction medium and reaction conditions are substantially the same. The products of each of these examples are appropriately identified and their physical constants and analyses disclosed in Table 1 below. Appropriate changes in the reaction conditions and recovery procedures may be made in a manner normally employed by these possessing the usual skill of this art. By appropriate changes in the starting materials beyond those disclosed but within the scope of the disclosure other compounds within the scope of this invention may also be prepared and are deemed included within the ambit of this invention.

TABLE 1.—2-SUBSTITUTED-1-ALKYL-1,2,3,4-TETRAHYDROQUINAZOLINE-4-ONES

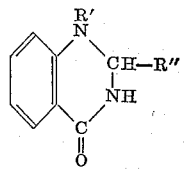

| | Comp. No. | R' | R" | Yield, percent | M.P.,° C. (corr.) | Formula | Analysis Calculated | | Analysis Found | | |
|---|---|---|---|---|---|---|---|---|---|---|---|
| | | | | | | | N | S | N | S | |
| Ex. 2 | I | Methyl | 2-furyl | 73.5 | 184.2-185-6 | $C_{13}H_{12}N_2O_2$ | 12.29 | | 12.18 | | Ex. 2. |
| Ex. 3 | II | ---do--- | 3-indolyl | 56.4 | 217-220 | $C_{17}H_{15}N_3O$ | 15.15 | | 15.03 | | Ex. 3. |
| Ex. 4a | III | ---do--- | 2-thienyl | 90.0 | 178.8-181.2 | $C_{13}H_{12}N_2OS$ | 11.46 | 13.11 | 11.00 | 12.83 | Ex. 4. |
| Ex. 5 | IV | ---do--- | phenyl | 62.9 | 206-207.5 (uncorr.) | $C_{15}H_{14}N_2O$ | 11.76 | | 11.79 | | Ex. 5. |
| Ex. 6 | V | n-Propyl | 2-furyl | 53.2 | 150.5-151.0 | $C_{15}H_{16}N_2O$ | 10.91 | | 10.30 | | Ex. 6. |
| Ex. 7 | VI | ---do--- | phenyl | 49.0 | 120.121 | $C_{17}H_{18}N_2O$ | 10.52 | | 10.82 | | Ex. 7. |
| Ex. 8a | VII | ---do--- | 2-thienyl | 48.9 | 146-148 | $C_{15}H_{16}N_2OS$ | 10.28 | 11.74 | 10.03 | 11.70 | Ex. 8. |
| Ex. 9 | VIII | Ethyl | phenyl | 72.5 | 141-143.5 | $C_{16}H_{16}N_2O$ | 11.10 | | 10.95 | | Ex. 9. |
| Ex. 10 | IX | 1-Propyl | ---do--- | 52.2 | 122-125 | $C_{17}H_{18}N_2O$ | 10.50 | | 10.52 | | Ex. 10. |
| Ex. 11 | X | n-Butyl | ---do--- | 85.8 | 111-112.5 | $C_{18}H_{20}N_2O$ | 10.00 | | 9.94 | | Ex. 11. |
| Ex. 1 | XI | n-Pentyl | ---do--- | 85.5 | 123.4-126 | $C_{19}H_{22}N_2O$ | 9.51 | | 10.12 | | Ex. 1. |

We claim:
1. A compound of the formula:

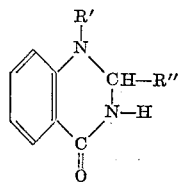

where R' is lower alkyl and R" is a heterocyclic radical chosen from the group consisting of furyl, indolyl and thienyl.

2. 1-methyl-2(3-indolyl)1,2,3,4-tetrahydroquinazoline-4-one.

3. 1-n-propyl-2(2-furyl)-1,2,3,4-tetrahydroquinazoline-4-one.

4. 1-methyl-2(2-thienyl)-1,2,3,4-tetrahydroquinazoline-4-one.

References Cited in the file of this patent
UNITED STATES PATENTS 2,408,633    Guenther et al. _____ Oct. 1, 1946

OTHER REFERENCES

Bohme et al.: Arch. Pharm., vol. 293 (1960), pages 1011–20.

Gut et al.: Chemical Abstracts, vol. 54 (1960), col. 4611 (ab. of Coll. Czechoslov Chem. Communs., vol. 24 (1959), pp. 3154–62).